July 9, 1957 D. W. GILL 2,798,733
COLLAPSIBLE WALKER-STROLLER FOR CHILDREN
Filed Nov. 1, 1955 3 Sheets-Sheet 2

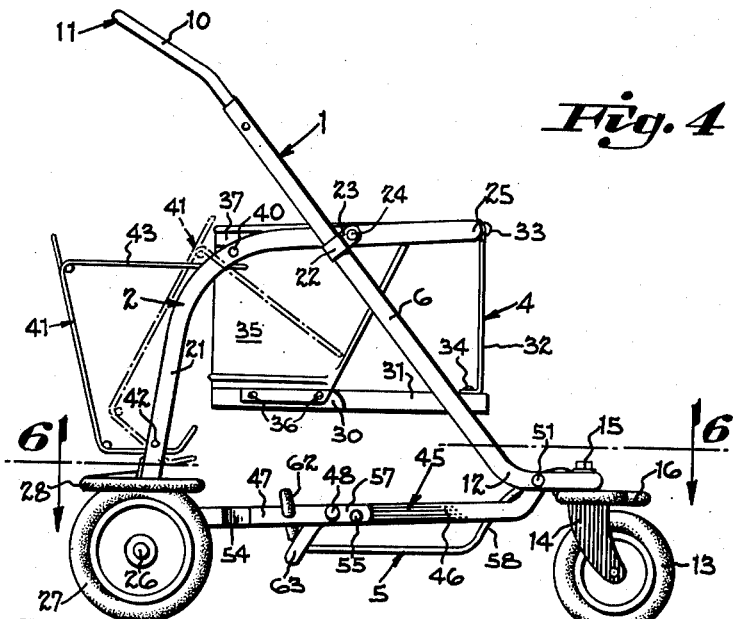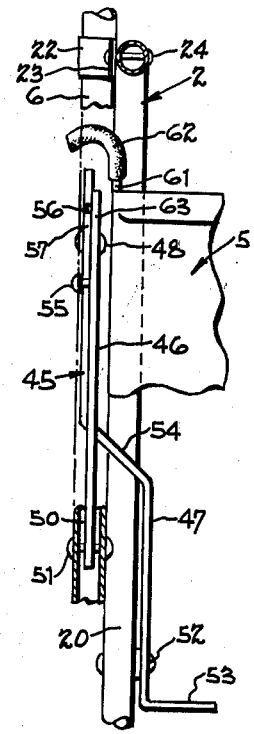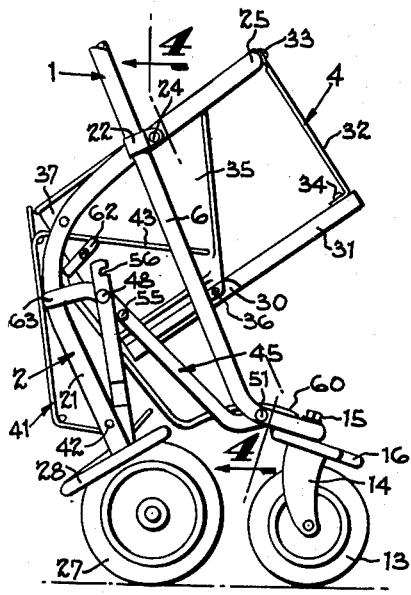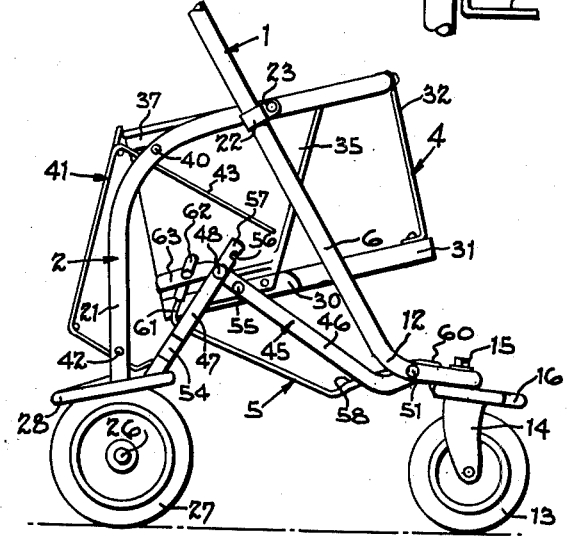

INVENTOR.
Donald W. Gill.
BY
Wood, Herron & Evans.
ATTORNEYS.

July 9, 1957  D. W. GILL  2,798,733
COLLAPSIBLE WALKER-STROLLER FOR CHILDREN
Filed Nov. 1, 1955  3 Sheets-Sheet 3
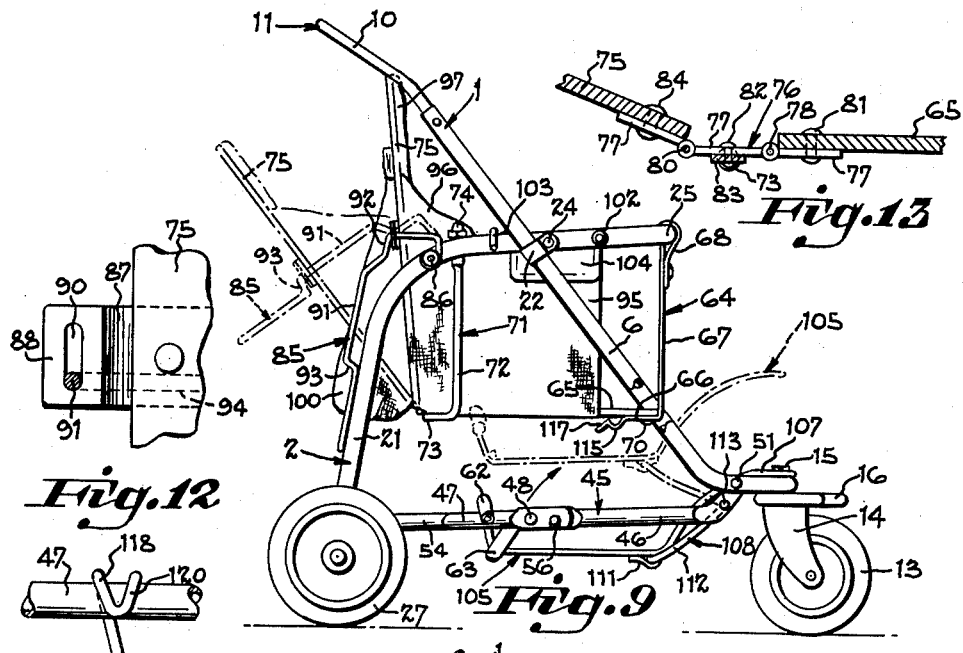
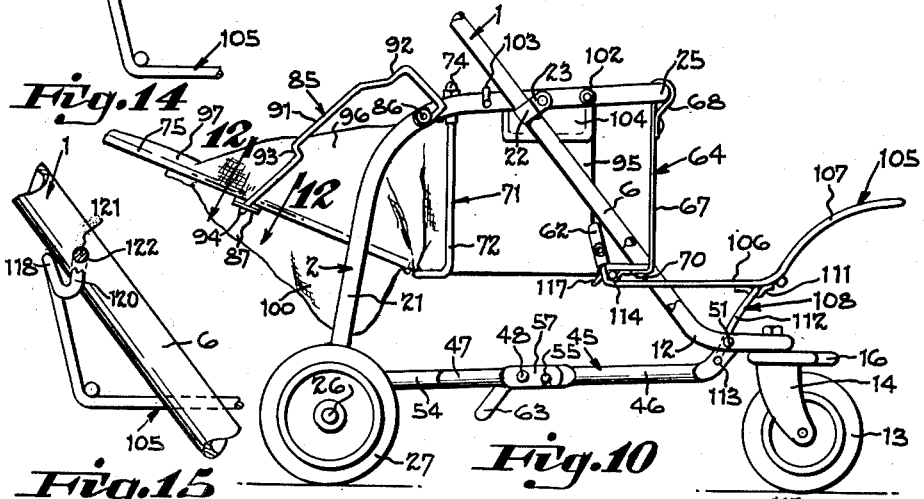
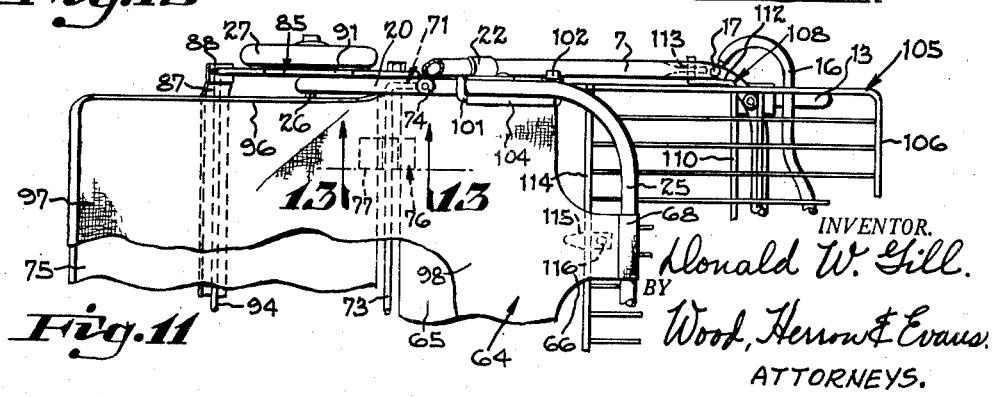
INVENTOR.
Donald W. Gill.
BY Wood, Herron & Evans
ATTORNEYS.

United States Patent Office 2,798,733
Patented July 9, 1957

2,798,733
COLLAPSIBLE WALKER-STROLLER FOR CHILDREN

Donald W. Gill, Amberly Village, Ohio, assignor to The Frank F. Taylor Company, Cincinnati, Ohio, a corporation of Ohio Application November 1, 1955, Serial No. 544,111

14 Claims. (Cl. 280—41)

This invention relates to collapsible wheeled vehicles for babies, and is directed particularly to a type of conveyance commonly known as a walker-stroller in which small children may be pushed about or in which small children may push themselves about.

A walker-stroller comprises a vehicle having a seat for the baby and a removable footboard disposed beneath the seat but above the floor level. When the footboard is removed, a child sitting on the seat may propel the vehicle with his feet, but for ordinary conveyance by a mother or nurse, the footboard may be installed to provide a foot rest.

The principal objective of this invention has been to provide a vehicle of this type which readily may be collapsed to occupy a smaller space without prior removal of the footboard.

A further objective of this invention has been to provide a collapsible walker-stroller having a rigid seat constructed to provide good support and rigidity during use of the vehicle, as a walker, but also having a footboard arranged beneath the rigid seat which is shifted to an out-of-the-way position within the framing members of the vehicle when it is collapsed.

According to this invention, the footboard, in consequence to collapsing of the chassis, is caused or directed to assume a position generally behind the rigid seat so as to reside generally within the extremities of the collapsed vehicle and thereby occupy an out-of-the-way space, even though it remains mounted on the vehicle. By this construction, the footboard conveniently accompanies the vehicle, such as whenever it may be collapsed and placed in an automobile, but is immediately ready for use whenever the vehicle is opened to receive the child. However, the footboard may easily be removed from the opened vehicle whenever it is to be employed as a baby walker.

Another objective of the invention has been to provide a collapsible vehicle, which in addition to its use as a stroller and baby walker, may also be converted into a sleeper in which the footboard, seat, and back rest coact with one another to form a generally horizontal baby bed for transporting a sleeping child comfortably.

In this aspect of the invention, the footboard has its forward end carried upon a pair of swinging links which guide the footboard forwardly and upwardly from its normal foot rest position to an elevated sleeper position. The swinging links coact with latching means at the rearward end of the footboard which lock the rearward end of the footboard at a forward limit of travel, with the footboard flush with the seat and projecting forwardly from it.

Another feature of the invention in its utility as a sleeper resides in the structure of the back rest which allows it to be selectively adjusted in a simple manner from an erect position to a full reclining position or to an intermediate reclining position for use in conjunction with the footboard to attain the most comfortable resting position for the child.

A further objective has been to provide improved latching means for the convertible footboard and back rest, which allows these parts to be adjusted quickly and conveniently to the selected positions and which hold the parts firmly and reliably in the selected adjustment to prevent accidents.

When equipped with the adjustable back rest and footboard, the vehicle can be converted into a stroller or sleeper without in any way interfering with the collapsing of the vehicle. The mounting of the foot rest is such that the foot rest shifts automatically to its position behind the seat when the vehicle is collapsed. One the other hand, the convertible foot rest may be removed entirely from the vehicle for use as a walker, as outlined above.

A typical structure exemplifying the foregoing objectives of this invention is illustrated in the accompanying drawings in which:

Figure 1 is a side elevation of the walker-stroller;

Figure 2 is a side elevation generally similar to Figure 1 but showing the walker-stroller in a partially collapsed state;

Figure 3 is a side elevation of the vehicle in collapsed state;

Figure 4 is a secional elevation taken on the line 4—4 of Figure 3;

Figure 9 is a side elevation of a modified vehicle similar to Figure 1 in which the footboard and back rest are shiftable to a reclining or sleeping position, the vehicle being shown in its stroller adjustment;

Figure 10 is a view similar to Figure 9 but showing the vehicle adjusted to its sleeping position;

Figure 11 is a fragmentary top plan view of the vehicle as projected from Figure 10;

Figure 12 is a fragmentary sectional view taken along line 12—12 of Figure 10, detailing a portion of the latch device which supports the back rest in its reclining or sleeper position;

Figure 13 is an enlarged fragmentary sectional view taken along line 13—13 of Figure 11, detailing the hinge connection between the seat and back rest;

Figure 14 is a fragmentary view taken from Figure 9 showing a footboard support of slightly modified construction; and Figure 15 is a fragmentary view taken from Figure 10 showing the modified footboard latching the footboard in elevated sleeper position.

In its general details, the walker-stroller of this invention may be constructed in a manner similar to those previously disclosed, as for example in the applicant's copending U. S. patent application Serial No. 292,861, filed June 11, 1952, for "Foldable Child's Vehicle," now abandoned. In general, the vehicle shown in Figures 1 to 8 comprises a front frame indicated generally at 1, a rear frame indicated generally at 2, a seat indicated generally at 4, and a footboard, 5.

Figure 5:
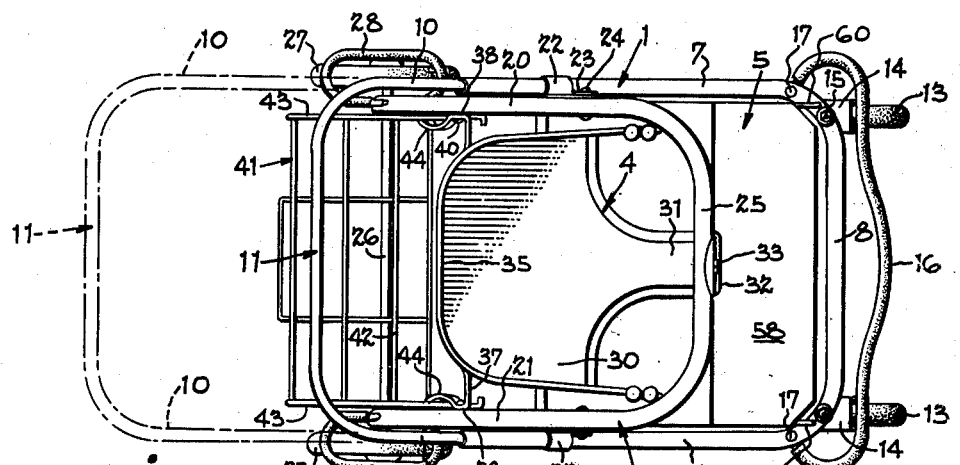
Figure 5 is a plan view of the vehicle looking down from the top.
Figure 6:
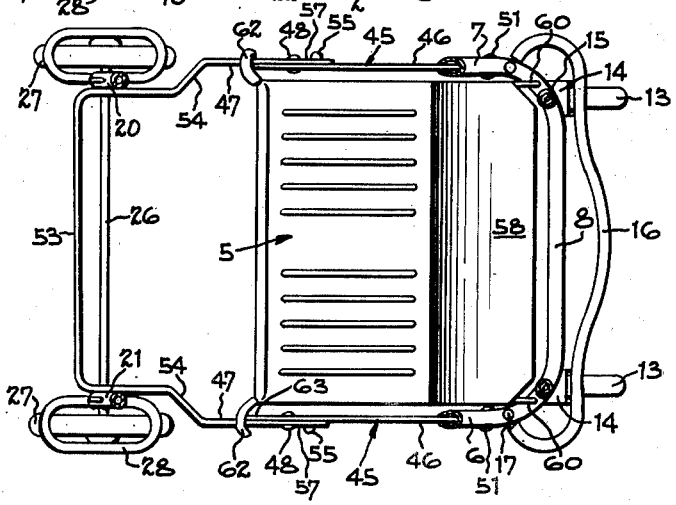
Figure 6 is a plan view looking down from the line 6—6 of Figure 1.

The front frame 1 comprises right and left hand leg portions 6 and 7 (Figure 5). For simplicity of construction, these legs are of tubular material which are formed in the general shape of a U so as to provide a cross connection 8 at the front end of the vehicle. The upper ends of the legs telescopically receive respective arm portions 10, 10 of a U-shaped handle member, indicated generally at 11. The arms 10, 10 are slidable in the legs 6 and 7 from an innermost position, shown in the full lines of Figure 5, to an extended operating position, as shown by the dot-dash lines of Figure 5. Latches (not shown herein) are employed to hold the handle in either position, a typical structure in this respect is shown in the applicant's copending U. S. patent application Serial No. 292,861.

The lower portion of the front frame is bent angularly as at 12 and is cross-bored rotatably to receive vertical axles of front wheels 13, 13 which are rotatably carried in forks 14 from which the vertical axles project. The vertical axles are held in place by nuts 15. A front bumper 16, of heavy rod material covered with resilient tubing is also mounted, as by riveting 17, at the lower portion of the front frame over the wheels 13, 13.

Rear frame 2 is constructed of tubular material and comprises spaced legs 20 and 21 which respectively cross the legs 6 and 7 of the front frame and reside between them. The front and rear legs are pivotally interconnected with one another through brackets 22, 22 one for each side, which respectively encircle the legs 6 and 7 and terminate in a flattened offset portion 23. The respective pivot pins 24 pass through the offsets 23 and through the rear legs and are riveted over the inside faces of the rear legs 20 and 21 (Figure 5).

The rear frame 2, like the front frame 1, is of generally U-shaped configuration with a frontal cross piece 25 interconnecting the forward portions of the legs 20 and 21. The upper frontal portion 25 of the rear frame resides in a substantially horizontal plane when the vehicle is open, while the rear end portions of the legs 20 and 21, below the handle 11, drop downwardly and are cross-bored at their lower extremities to carry a rear axle 26 upon which rear wheels 27, 27 rotatably are mounted. Rear wheel bumpers 28, 28 are mounted just above the rear wheels; these bumpers are of oval shape, as shown best in Figure 6, so as to extend outwardly beyond the wheels. The inner ends of the bumpers are suitably fastened to the rear legs 20 and 21 above the axle 26.

Thus, the legs of the front and rear frames 1 and 2 cross one another and are pivotally interconnected for swinging movement of the frames toward and from the open and collapsed position shown respectively in Figures 1 and 3. While the legs of the rear frame are arranged within the legs of the front frame in the structure shown, they may be positioned at the outside thereof if desired.

In the structure shown, seat 4 is suspended from the rear frame 2 between the legs 20 and 21 thereof. The seat proper 30, which may be formed of wood or the like, has a broad back portion from which a relatively narrow tongue portion 31 projects forwardly (Figure 5). The spaces at either side of the tongue between the front legs 6 and 7 accommodate the child's legs, and the forward extremity of the tongue is suspended from the frontal cross bar 25 of the rear frame by a bracket 32 which is fastened in place at its extremities by the rivets 33 and 34. The rear end portion of the seat is supported from the rear frame by a back rest and guard member 35 which is made of sheet metal formed to U-shape so as to fit around the baby's back. The lower portion of this guard is fastened to the rearward edgewise portion of the seat 30 by wood screws 36 or the like at each side of the seat. A strap-like bracket 37 extends along the rear upper edge of the back rest and projects sidewisely therefrom, as seen in Figure 5. Foot portions 38 are bent laterally from the sidewise projections, and these foot portions are riveted as at 40 to the inner faces of the rear frame. The central portion of the bracket 37 is fastened to the guard and back rest 35 in any suitable manner as by spot welding.

For convenience to the housewife or nurse who may have packages to convey as well as the baby, the vehicle may be provided with a wire rack 41. This is installed between the legs 20 and 21 of the rear frame behind the seat so that the back rest 35 in effect constitutes the front wall of the rack. The rack is pivotally mounted upon the rear frame 2 by means of a cross rod 42 which extends between and has its endwise portions journalled in the rear legs 20 and 21. The upper portion of the rack is provided with side arms 43, 43 which project forwardly and pass through bent loops 44 which form a part of the foot portions 38 of the back rest strap-like bracket 37 (Figure 5). The forward extremities of the side arms 43 are bent laterally to limit rearward movement of the arms through the loops 44 in which the arms are slidable. The package rack by this construction may occupy an open position to receive parcels, as shown by the full lines in Figure 1, or closed, out-of-the-way position, as shown by the dot-dash lines.

Since the crossed front and rear frames are pivotally interconnected to one another, it is commonplace in the art to cross connect them by stretchers at their lower extremities so as to prevent the legs from sliding beyond their normally open position under the weight load of the baby. In accordance with the present invention, however, the stretcher members are constructed additionally to support the footboard 5 for the child's feet and to cooperate, during collapsing of the vehicle, in directing the footboard automatically to an out-of-the-way position behind the seat back. Accordingly, the footboard need not be separately removed from the vehicle as an incident to collapsing it. Since the child may move his feet about over a substantial area while being pushed in the conveyance, it is requisite, of course, that the foot rest be of substantial size beneath the seat. Because of its size, the footboard, in conventional structures, commonly cannot be nested in amongst the other parts of the vehicle when it is collapsed but by this invention, the footboard, even though of the conventional size, may remain in place when the legs are brought or swung together.

Figure 7:
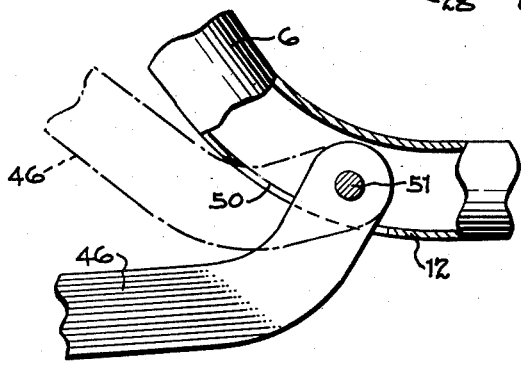
Figure 7 is an enlarged sectional elevation showing the pivotal mounting of the front end of one of the stretchers.

In the present construction, the stretcher members indicated generally at 45, extend between the lower extremities of the respective front and rear legs. Each stretcher comprises a front link 46 and a rear link 47, these links being pivotally interconnected to one another by the pivot pins 48 which are riveted over to hold them in place. The front links of each stretcher are pivotally connected to the lower portions 12 of the legs 6 and 7 of the front frame, as is shown in Figure 7. For this purpose, each tubular leg contains a longitudinal slot 50 which receives an endwise portion of the front link, while a pivot pin 51 passes transversely through the tubular leg and link to hold the link in place. The ends of the pivot pins are riveted; in the construction shown, the endwise portion of the front link is bent upwardly so as to enter the leg slot 50 from the bottom face of the leg. This construction is not essential and may be varied to suit the particular shape or configuration which is chosen for the front frame construction.

The rear links 47 at each side of the vehicle are pivotally connected to the lower portions of the rear legs 20 and 21 respectively by means of suitable pivot pins or screws 52 (Figure 4). For additional rigidity, the rear links may be in the form of forwardly projecting arms which are cross connected to the back rest of the vehicle by a cross piece 53. Since the rear legs are spaced inwardly from the front legs, the rear links 47 are offset as at 54 (Figure 6) so as to clear the legs 20 and 21. Each stretcher assembly also includes a rigid stop pin 55 which projects outwardly from the front links 46, 46. The stop pins are located forwardly of pivot pins 48, 48 for engagement by a portion of the mating links projecting beyond the pivot pins 48. The stop pins engage respective notches 56 formed in the forward end portions 57 of the rear links 47 and lock the links in the horizontal position shown in Figure 1.

Figure 8:
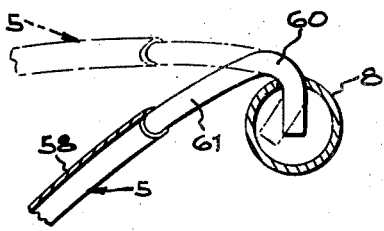
Figure 8 is an enlarged sectional view showing the mounting for the front end of the footboard.

Foot rest 5 may be of sheet metal construction extending over the entire general area beneath the seat 4 and also extending forwardly thereof. Preferably, although not necessarily, the foot rest may comprise a generally horizontal floor portion directly beneath the seat, and an upwardly bent forward portion 58 extending crosswise of the vehicle. The front part 58 of the foot rest, preferably adjacent its sidewise edges, is equipped with hooks 60, 60. These hooks may be formed at the extremities of the metal rods 61 extending along the side edges of the footboard over which the metal thereof is crimped. The hooks are received in suitable bores in the cross bar 8 of the front frame so that the front part of the footboard thereby is sustained. However, the bores are sufficiently large to permit pivotal movement of the footboard as is shown in Figure 8.

The back part of the footboard also is equipped with hooks 62. These may be formed as upwardly extending portions of the same footboard side rods which are bent at the front and to provide the hooks 60. For quiet operation, the short hooks 62 preferably are covered with tubing or the like to avoid rattle. Hooks 62 normally are sustained on the rear links 47 of the stretchers respectively. Therefore, when the front and rear frames are swung for collapsing of the vehicle, the front and rear stretcher links 46 and 47 move angularly as the pivot pins 48 are elevated and the footboard thereby partially is elevated due to the angularity of the rear links.

However, to prevent continued lifting of the rearward portion of the footboard, the front links 46 are provided with rearwardly extending projections 63, 63, one for each side, which reside beyond the pivot pins 48. Thus, as rear links 47 assume more and more angularly inclined positions as the front and rear legs are swung progressively closer to one another during collapsing, the lift projections 63 engage the hooks 62 which otherwise would tend to slide down the rear links. Such transference of the footboard control from the rear links to the lifts 63 is illustrated in Figure 2. In this position, it may be seen that the footboard is moving upwardly to an inclined position behind the seat. The lifts 63 may retain control of the footboard throughout the entire collapsing movement of the frames. However, in the present disclosure, the positioning of the footboard behind the seat is caused by the engagement of rear portion of the footboard with the front faces of the rear legs 20 and 21 (Figures 3 and 4). Thus, in the moving of the parts from the position shown in Figure 2 to the position shown in Figure 3, the footboard, moving backwardly toward the rear legs at the same time that it is carried upwardly by the lifts 63, eventually comes into contact with the front faces of the rear legs at which time it is angularly disposed with respect thereto. Therefore, during the final collapsing movement, the rear portion of the footboard may merely slide upwardly along the guide surfaces provided by the rear legs, the hook 62 leaving the lifts 63 as it does so. In the final position, the footboard is nested between the rear legs and the back of the rigid seat.

Subsequently, when the collapsed vehicle is to be opened for use, the rear portions of the footboard slide downwardly along the rear links as the front frame is moved forwardly until the hooks 62 re-engage the lifts 63. Further sliding movement of the front legs with respect to the rear legs permits the lifts 63 to lower the hooks 62 until they re-engage the rear links 47 of the stretchers.

By this construction, the advantages of a rigid seat and rigid footboard of the usual size are provided in conjunction with the desirable feature of collapsibility of the vehicle so that it may be compacted as to size for conveyance in transportation or storage. When collapsed, however, it will be noted from Figure 3 that the center of gravity of all the parts resides on a vertical axis between the front and rear frames so that the vehicle will not tip over when collapsed.

Whenever the vehicle is to be converted from a stroller to a walker for exercising the child's legs, the footboard readily may be demounted merely by disengaging the front hooks 60 from the cross bar 8 and the rear hooks 62 from the rear links 47 so as to permit the footboard to be taken away.

The articulated front and rear frames, coacting with the stretchers, allow the vehicle to be collapsed or extended very conveniently without the manipulation of latches or other intricate parts. In other words, the structure is self-locking in erected position by engagement of the notches 56 of the stretchers with the stop pins 55. This engagement, as shown in Figure 1, locks the stretchers rigidly in horizontal alignment, and ties the lower ends of the front and rearward frames rigidly in spaced relationship.

The self-latching engagement of the stretchers allows the vehicle to be collapsed conveniently by applying downward pressure upon the rearward cross bar 53, thus pivoting the stretchers upwardly toward their collapsed position. The collapsing motion thereafter may be completed by applying force upwardly and forwardly upon the U-shaped handle 11 with the foot engaged against the cross bar, thus pivoting the frames 1 and 2 in scissors fashion until the front wheels reach the position shown in Figure 3. To convert the vehicle back to its open position, downward pressure may be applied upon the handle 11 to pivot the two frames 1 and 2 about pivot point 24 to extend the stretchers back to their self-locking straight position.

The modified vehicle shown in Figures 9 to 15 essentially is the same as the above described structure except that it includes a shiftable back rest and shiftable foot rest which allows the unit to be converted into a sleeper. As best shown in Figures 9 and 10, the vehicle includes a front frame 1 and a rear frame 2 having stretchers 45 pivotally connected to the lower ends of the frames. The structure so far described follows the principle of construction and operation described above.

The shiftable foot rest and back rest reside in substantially the position described earlier when the vehicle is utilized as a stroller and the footboard may be removed for use as a walker. When converted into a sleeper, the foot rest is elevated to the plane of the seat, while the backrest is lowered to the substantially horizontal position as shown in Figure 10. In this position, the foot rest, seat, and back rest form a generally horizontal surface useable as a baby bed.

Described with reference to Figures 9 and 10, the stretchers 45 in the present case, are formed of tubular material but are otherwise identical, including the self-latching intermediate pivot joint 48. The seat 64 consists of a panel 65 having a tongue 66 which is connected to the front cross bar 25 by means of a suspension strap 67 formed of fabric material having its upper end looped as at 68 around the cross bar 25. The lower end of the strap is connected to the tongue preferably by a snap fastener 70.

The rearward end portion of the seat is supported by a hanger 71 formed of rod stock having a generally U-shaped configuration providing a pair of vertical suspension rods 72, 72 joined by a cross bar 73 extending across the rearward edge of the seat panel. The upper ends of the vertical rods pass through the horizontal portions of rear legs 20 and 21 of the rear frame 2. The vertical rods are secured in position by nuts 74 threaded upon the upper ends of the rods. The seat panel is thus suspended at its forward end by strap 67 and at its rearward end portion by the hanger 71.

The present structure includes a hinged back rest 75 in the form of a panel having its lower end hinged to the rearward end of the seat panel. As shown in Figures 9 and 10, the back rest may be shifted to three different positions, the first being an erect adjustment as shown in full lines in Figure 9; the second being a partially reclining position shown in broken lines in Figure 9; and the third being the full reclining position shown in full lines in Figure 10.

The back rest is pivotally connected to the seat by the hinge 76, as illustrated in Figure 13. The hinge is provided with three leaves 77 pivoted together as at 78 and 80. The first leaf is attached as at 81 to the rearward edge of the seat panel; the intermediate leaf is secured as at 82 to the flattened portion 83 of the seat support cross bar 73; and the rearward leaf is secured as at 84 to the lower edge of the back rest 75. The structure preferably is provided with two hinges 76 located at opposite sides of the seat structure as indicated in Figure 11.

The hinged back rest is supported in its three positions by a U-shaped latch 85 which is pivotally connected as at 86 to the rear legs 20 and 21 at opposite sides. The back rest includes a latch bar 87 having outwardly projecting end portions 88 at opposite sides, each including a slot 90. The arms 91, 91 of the U-shaped latch project through the slots as indicated. To support the back rest in the erect position of Figure 9, the latch arms each include an angular offset 92 which engage the end extension 88 at opposite sides. To adjust the back rest to its intermediate reclining position shown in broken lines, the latch bar is elevated sufficiently to disengage the first offsets 92, allowing the end extensions 88 to slide rearwardly along the latch arms 91 as the back rest pivots rearwardly about the hinge pivots 80. Each latch arm includes a second angular offset 93 which engages the end extensions 88 in the intermediate position of the back rest as shown in Figure 9. When the back rest is to be adjusted to full reclining position, the latch arms are again elevated to allow the second offset 93 to pass through slot 90. This allows the back rest to move downwardly until it bears against the cross bar 94 of the U-shaped latch as shown in Figure 11.

In place of the bucket-type seat shown in Figure 1, the sleeper structure is provided with fabric side panels 95, 95, each including a foldable gusset 96 joined to the adjustable back rest. The gusset is generally triangular as viewed in Figure 10 and joins the side panel on opposite sides as a continuation to prevent the child from rolling out of the bed when in its sleeper adjustment. In the erected position of the back rest, the gussset 96 folds flat against the back rest. The supporting surface of the back rest preferably is covered with soft padding as indicated at 97, the rearward edge of the gusset being joined to the padding. The seat panel includes similar padding 98 (Fig. 11).

In place of the wire package rack 41 shown in Figure 1, the convertible back rest is provided with a pouch or bag 100 which is attached directly to the rear surface of the back rest. The upper end of the pouch has an opening to allow the packages to be placed in it.

The fabric side panels of the seat are attached to the horizontal portions of legs 20 and 21 by a pair of brackets 101, each bracket having a forward end projecting through the leg and secured in position by a nut 102. The rearward end of each bracket is bent to form a hook 103 which embraces the leg. The panel is attached to the bracket at opposite sides by means of a flap or tab 104 which is formed at the upper edge of the side panels 95. Each flap is doubled over the bracket and is secured by stitching to the outer surface of the side panel.

When the vehicle is to be used as a stroller, the back rest is adjusted to the erect position shown in Figure 9 and the foot rest is adjusted to its lowered position similar to Figure 1. For use as a walker, the foot rest is removed as described earlier, to allow the child to propel the vehicle.

When it is to be converted into a sleeper, the back rest is lowered to the position shown in Figure 10 and the foot rest is elevated to the plane of the seat and latched to the forward end of the seat. The shiftable foot rest, which is indicated generally 105, preferably is formed of wire grill work consisting of rectangular frame 106 having parallel bars as best shown in Figure 11. As viewed from the side, the forward portion of the foot rest curves upwardly and forwardly in the form of a dashboard 107 similar to the structure described earlier. In order to shift the foot rest to the elevated sleeper position, its forward end is supported by a U-shaped link 108 having a cross bar 110 extending across the foot rest (Figure 11) and pivotally connected by brackets 111 secured to the undersurface of the foot rest. A pair of swinging arms 112, 112 extend from opposite ends of cross bar 110 and have pivot ends 113 journalled in the forward stretcher links 46. The arms 112 have a length to support the foot rest at the desired elevation when it is in lowered position (Figure 9) and also to support it at the plane of the seat when shifted to its sleeper position (Figure 10).

To convert the vehicle, the foot rest is shifted upwardly and forwardly as indicated by the broken lines in Figure 9, the arms 112 swinging through an arc as the foot-rest moves forwardly as indicated by the arrow. When the foot rest is completely elevated, the arms have swung to a position in which the upper cross bar 110 has passed beyond pivot ends 113. In this position, the cross bar 114 of the rearwardly edge of the foot rest frame 106 may be snapped into engagement with the spring clip 115 which supports the rearward end of the foot rest.

As indicated in Figure 11, the spring clip is attached by a rivet or the like 116 to the tongue portion of the seat. The clip includes a downwardly inclined spring lip 117 which springs the clip open as cross bar 114 moves forwardly into the clip. Since the arms 112 at opposite sides are swung forwardly when the cross bar is engaged in the clip, downward force on the erected foot rest tends to swing the arms downwardly and forwardly beyond their lower pivot ends 113. This movement is resisted by the spring clip, the foot rest being supported firmly in its erected position by the coacting arms and clip.

When the foot rest is to be lowered, the clip 115 is sprung open to release the cross bar 114 by forcing the lip 117 rearwardly, thereupon the links are swung in the reverse direction to lower the foot rest until its hooks 62, 62 again engage the stretchers. In this position, the forward end of the foot rest is supported upon the cross bar 8 as indicated in Figure 9.

To convert the vehicle to a walker, the swinging arms 112 are sprung inwardly to disengage their pivot ends 113 from the stretcher members in which they are journalled. After the arms are disengaged, the entire foot rest may be removed from the vehicle, allowing the child's feet to reach the floor and propel the vehicle.

A somewhat modified support for the rearward end of the foot rest is shown in Figures 14 and 15. According to this arrangement, the hooks 118, 118 are doubled toward themselves to a V-shaped configuration as viewed from the side. The outer limb 120 of the V-shaped hook at each side includes an inwardly projected stud 121 (Figure 15). In its lowered position (Figure 14) the V-shaped hooks rest upon the rear stretcher links 47 in the same manner as the single hook 62 of Figure 9. When erected to the sleeper position of Figure 15, the V-shaped hooks 118 are sprung apart and the stud 121 of each hook is inserted in a hole 122 formed in the tubular legs 6 and 7 of front frame 1. Accordingly, the clip 115 of Figure 10 may be eliminated, the rearward end of the foot rest being supported by the direct engagement of studs 121. To lower the foot rest, the studs are disengaged by springing the V-shaped hooks apart sufficiently to draw the studs from the apertures of legs 6 and 7.

From the foregoing, it will be seen that the vehicle of Figures 9 to 15 is readily converted to a stroller or sleeper by a simple adjustment of the foot rest and back rest; also that it is converted to a walker by removing the foot rest. Since the structure includes lifts 63 and follows the principles of the vehicle of Figures 1 to 8, it is collapsible in the same manner without removal of the foot rest. When the vehicle is to be collapsed, the foot rest is shifted to its lowered or stroller position of Figure 9, then the frames are swung to closed position as in Figures 2 and 3, causing the lifts 63 to engage the hooks 62 or 118 of the foot rest as described earlier.

Having described my invention, I claim:

1. A collapsible walker-stroller for babies, comprising front and rear frames each having a pair of legs, the legs of the pairs residing in spaced relationship to one another and the legs of the front frame crossing the legs of the rear frame and respectively being pivotally interconnected thereto, for swinging movement of the frames toward and from a collapsed position, transport wheels journalled upon the lower portions of said frames, a seat suspended between the legs of one of said frames, pivotally interconnected links having their endwise portions attached to the lower extremities of the legs of said pairs respectively, a footboard, means at the forward portion of the footboard pivotally connected to the lower portion of one of said frames, said footboard including support means slidably engaged upon the respective links which reside rearwardly beyond the points of pivotal connection of the links in relation to the frontal portion of the footboard, whereby the rearward links of each stretcher, rising in consequence to collapsing movement of one frame toward the other, causes lifting of the rearward portion of the footboard to a position wherein it resides intermediate the rearward portion of the seat and one of said frames.

2. A collapsible walker-stroller for babies, comprising a front frame, a rear frame, each of said frames comprising a pair of legs in spaced relationship to one another, the legs of the front frame crossing the legs of the rear frame and being respectively pivotally interconnected thereto for swinging movement of the frame toward and from collapsed and open position, a seat supported from and between the legs of one of said frames, each of said frames having roller wheels mounted thereon at the lower extremities thereof, a stretcher for sustaining each pivotally interconnected front and rear leg assembly from collapse beyond open position, the stretcher comprising a front link connected to one leg, a rear link connected to the other leg, means pivotally interconnecting the said links to one another, the front link of each stretcher having a lift portion extending rearwardly beyond the point of pivotal interconnection of the links, and a footboard located beneath said seat, the forward portion of said footboard being supported on the lower portion of the front frame, and means for sustaining the rearward portion of the footboard upon the rearward links of said stretchers respectively, whereby swinging movement of said frames from open to collapsed position causes the rearward links of said stretchers, in lifting, to direct the rearward portion of the footboard upwardly toward said seat and the lift portions of the front links of the said stretchers subsequently to direct the rearward portion of said footboard to a position generally between the rearward portion of said seat and the rear frame.

3. A collapsible stroller and walker for babies, comprising a front frame and a rear frame each having a pair of legs, the legs of the front frame crossing the legs of the rear frame, means pivotally connecting each leg of the front frame to a corresponding leg of the rear frame for swinging movement of the frames toward and from a collapsed position thereof, a seat suspended from one of said frames between the pair of legs thereof, front and rear wheels rotatably mounted at the lower extremities of said frames, stretcher members respectively interconnecting the lower extremities of the legs of the front frame with the legs of the rear frame, the said stretchers comprising links pivotally interconnected for swinging movement in an upward direction to accommodate collapsing of the front and rear frames, a footboard, pivot elements at the forward portion of the footboard supporting the same relative to the front frame, hook elements extending outwardly from the rearward portion of the footboard engaged upon the rearward links of the stretchers, said pivot elements and hook elements removably supporting the footboard beneath the seat, whereby the said stretchers upon collapsing of the same lift and direct the rearward portion of the footboard to a position intermediate the rear frame and the rearward portion of said seat.

4. A collapsible walker-stroller for babies, comprising a front frame, a rear frame, each of said frames comprising a pair of legs in spaced relationship to one another, the legs of the front frame crossing the legs of the rear frame and being respectively pivotally interconnected thereto for swinging movement of the frame toward and from collapsed and open position, a seat supported from and between the legs of one of said frames, each of said frames having roller wheels mounted thereon at the lower extremities thereof, a stretcher for sustaining each pivotally interconnected front and rear leg assembly from collapse beyond open position, the stretcher comprising a front link pivotally connected to one leg, a rear link pivotally connected to the other leg, means pivotally interconnecting the said links to one another, the front link of each stretcher having a lift portion extending rearwardly and downwardly beyond the point of pivotal interconnection of the links, a footboard, pivot means on the forward portion of said footboard detachably supporting the same relative to the front frame and support means on the rearward portion of the footboard detachably engaged upon the rearward links of said stretchers, the said pivot means and support means of the footboard removably supporting the footboard beneath the seat, whereby swinging movement of said frames from open to collapsed position causes the rearward links of said stretchers, in lifting, to direct the rearward portion of the footboard upwardly toward said seat and the lift portions of the front links of the said stretchers subsequently to direct the rearward portion of said footboard to a position generally between the rearward portion of said seat and the rear frame.

5. A collapsible vehicle for babies arranged to be converted selectively into a stroller or sleeper comprising a front frame and a rear frame, each of said frames having a pair of spaced legs, the legs of the front frame crossing the legs of the rear frame, means pivotally connecting each leg of the front frame to a corresponding leg of the rear frame for swinging movement of the frames toward and from a collapsed position, a seat suspended from one of said frames between the pair of legs thereof, front and rear wheels rotatably mounted upon the lower extremities of said frames, stretcher members respectively interconnecting the lower extremities of the crossed legs of the front frames with the legs of the rear frames, the said stretcher members each comprising a pair of links pivotally interconnected for swinging movement upwardly to accommodate collapsing of the front and rear frames, a footboard, a swinging member having opposite ends pivotally connected to the forward end of the vehicle and to a forward portion of the footboard, support means on the rearward portion of the footboard removably sustained upon the links of said stretcher members, the said swinging member and support means sustaining the footboard beneath said seat when the vehicle is converted into a stroller whereby, upon collapsing of the vehicle, the upward swinging movement of said links shifts the rearward portion of the footboard upwardly to a position between the rearward portion of the seat and one of said frames, the said swinging members guiding the footboard through an arc of movement upwardly and forwardly to an elevated plane extending forwardly from the seat when the vehicle is converted into a sleeper.

6. A collapsible vehicle for babies arranged to be converted selectively into a stroller or sleeper comprising a front frame and a rear frame, each of said frames having a pair of spaced legs, the legs of the front frame crossing the legs of the rear frame, means pivotally connecting each leg of the front frame to a corresponding leg of the rear frame for swinging movement of the frames toward and from a collapsed position, a seat suspended from one of said frames between the pair of legs thereof, front and rear wheels rotatably mounted upon the lower extremities of said frames, stretcher members respectively interconnecting the lower extremities of the crossed legs of the front frames with the legs of the rear frames, the said stretcher members each comprising a pair of links pivotally interconnected for swinging movement upwardly to accommodate collapsing of the front and rear frames, a footboard, a swinging member having opposite ends pivotally connected to the forward end of the vehicle and to a forward portion of the footboard, support means on the rearward portion of the footboard removably sustained upon the links of said stretcher members, the said swinging member and support means sustaining the footboard beneath said seat when the vehicle is converted into a stroller whereby, upon collapsing of the vehicle, the upward swinging movement of said links shifts the rearward portion of the footboard upwardly to a position between the rearward portion of the seat and one of said frames, the said swinging members guiding the footboard through an arc of movement upwardly and forwardly to an elevated plane extending forwardly from the seat when the vehicle is converted into a sleeper, and latching means connecting the rearward end of the footboard to the seat when the same is shifted to said elevated plane, whereby the footboard is supported by the latching means and swinging member in said elevated sleeper position.

7. A collapsible vehicle for babies arranged to be converted selectively into a stroller or sleeper comprising a front frame and a rear frame each having a pair of spaced legs, the legs of the front frame crossing the legs of the rear frames, means pivotally connecting each leg of the front frame to a corresponding leg of the rear frame for swinging movement of the frames toward and from a collapsed position, a seat suspended from one of said frames between the spaced legs thereof, a back rest having a lower edge hingedly connected to the rearward portion of the seat, releasable means supporting the back rest selectively in an erect stroller position or in an inclined sleeper position, transport wheels rotatably mounted at the lower extremities of said frames, stretchers respectively interconnecting the lower extremities of the front frame and rear frame, each stretcher comprising a pair of links pivotally interconnected for swinging movement upwardly to accommodate collapsing of the front and rear frames, a footboard, and a swinging member having opposite ends pivotally connected to the forward end of the vehicle and forward portion of the footboard and support means on the rearward portion of the footboard engaging the rearward links of the stretchers, said support means and swinging member supporting the footboard beneath the seat when the vehicle is converted into a stroller, whereby the said stretchers, upon collapsing of the vehicle, swing upwardly and direct the rearward portion of the footboard to a position intermediate the rear frame and rearward portion of the seat, said swinging member guiding the forward end portion through an arc upwardly and forwardly from said stroller position to an elevated sleeper position forming a forward extension of the seat.

8. A collapsible vehicle for babies arranged to be converted selectively into a stroller or sleeper comprising a front frame and a rear frame each having a pair of spaced legs, the legs of the front frame crossing the legs of the rear frame, means pivotally connecting each leg of the front frame to a corresponding leg of the rear frame for swinging movement of the frames toward and from a collapsed position, a seat suspended from one of said frames between the spaced legs thereof, a back rest having a lower edge hingedly connected to the rearward portion of the seat, releasable means supporting the back rest selectively in an erect stroller position or in an inclined sleeper position, transport wheels rotatably mounted at the lower extremities of said frames, stretchers respectively interconnecting the lower extremities of the front frame and rear frame, each stretcher comprising a pair of links pivotally interconnected for swinging movement upwardly to accommodate collapsing of the front and rear frames, a footboard, and a swinging member having opposite ends pivotally connected to the forward end of the vehicle and forward portion of the footboard, support means on the rearward portion of the footboard engaging the rearward links of the stretchers, said support means and swinging member supporting the footboard beneath the seat when the vehicle is converted into a stroller, whereby the said stretchers, upon collapsing of the vehicle, a swing upwardly and direct the rearward portion of the footboard to a position intermediate the rear frame and rearward portion of the seat, said swinging member guiding the forward end portion through an arc upwardly and forwardly from said stroller position to an elevated sleeper position forming a forward extension of the seat, and latch means on the forward portion of the seat engaging the rearward portion of the footboard in said elevated sleeper position, whereby the swinging member and latch means support the footboard in said sleeper position, said back rest pivoting to said reclining position supported by the said releasable means and forming a rearward extension of the seat when the vehicle is converted into a sleeper.

9. A collapsible vehicle for babies arranged to be converted into a sleeper or stroller comprising a front frame and a rear frame each having a pair of spaced legs, the legs of the front frame crossing the legs of the rear frame, means pivotally connecting each leg of the front frame to a corresponding leg of the rear frame, said frames being movable toward and from one another to a collapsed and extended position, a seat suspended from one of said frames between the spaced legs thereof, transport wheels rotatably mounted at the lower extremities of said frames, stretchers respectively interconnecting the lower extremities of the front and rear frames, said stretchers locking said frames in an extended position and being pivotally interconnected for swinging movement upwardly to accommodate collapsing of the front and rear frames, a footboard, a swinging member having opposite ends pivotally connected to the stretchers and to the forward portion of the vehicle, support elements on the rearward portion of the footboard engaging said stretchers, said swinging member and support means supporting the footboard beneath the seat when the vehicle is converted into a stroller, said stretchers, upon collapsing of the vehicle, lifting and directing the rearward portion of the footboard from said stroller position to a collapsed angular position intermediate the rear frame and rearward portion of the seat, said swinging member guiding the footboard in an arc forwardly and upwardly to an elevated plane substantially flush with the seat and projecting forwardly from the seat when the vehicle is converted into a sleeper, latch means on the seat engaging the rearward portion of the footboard in said sleeper position, the swinging member residing in an angular position with the upper end thereof, which is pivotally connected to the footboard, disposed above and beyond the lower end which is pivotally connected to the vehicle, whereby the weight load imposed upon the footboard urges the same forwardly against the said latching means to hold the footboard rigidly in said elevated sleeper position.

10. A collapsible vehicle for babies arranged to be converted into a sleeper or stroller comprising a front frame and a rear frame each having a pair of spaced legs, the legs of the front frame crossing the legs of the rear frame, means pivotally connecting each leg of the front frame to a corresponding leg of the rear frame, said frames being movable toward and from one another to a collapsed and extended position, a seat suspended from one of said frames between the spaced legs thereof, transport wheels mounted at the lower extremities of said frames, stretchers respectively interconnecting the lower extremities of the front and rear frames, said stretchers locking said frames in an extended position and being pivotally interconnected for swinging movement upwardly to accommodate collapsing of the front and rear frames, a footboard, a swinging member having opposite ends pivotally connected respectively to the forward portion of the vehicle and forward portion of the footboard, and hook elements on the rearward portion of the footboard, said hook elements being engageable with the said stretchers when the vehicle is converted into a stroller, said swinging member and hook elements supporting the footboard beneath the seat when the vehicle is converted into a stroller, said stretchers, upon collapsing of the vehicle, lifting said hook elements and directing the rearward portion of the footboard from said stroller position to a collapsed position intermediate the rear frame and rearward portion of the seat, said swinging members swinging through an arc and guiding the footboard forwardly and upwardly to an elevated plane projecting forwardly from the seat when the vehicle is converted into a sleeper, said hook elements being engageable with the legs of one of said frames and supporting the rearward portion of the footboard in said elevated sleeper position with the swinging member residing in an angular position, whereby the weight load imposed upon the footboard urges the same in a generally horizontal plane, the hook elements locking the footboard against said movement and coacting with the swinging member to sustain the footboard rigidly in said elevated sleeper position.

11. A collapsible vehicle for babies arranged to be converted into a sleeper or stroller comprising a front frame and a rear frame disposed in crossed relationship and pivotally connected together at the intersection thereof, said frames being movable toward and from one another to a collapsed and extended position, a seat suspended from one of said frames, transport wheels mounted at the lower extremities of said frames, articulated stretcher means interconnecting the lower extremities of the front and rear frames, said stretcher means locking said frames in an extended position and folding upwardly upon collapsing of the front and rear frames, a footboard, a swinging member having opposite ends pivotally connected respectively to the forward portion of the vehicle, hook elements on the rearward portion of the footboard engaging said stretchers, each of said hook elements having an end portion projecting along an axis transverse to the vehicle, the spaced legs of one of said frames having apertures formed therein above the lower extremities thereof residing on an axis transverse to the vehicle, said swinging member and hook elements supporting the footboard beneath the seat when the vehicle is converted into a stroller, said swinging member swinging in an arc and guiding the footboard forwardly and upwardly to an elevated plane projecting forwardly from the seat when the vehicle is converted into a sleeper, said end portions of the hook elements being engaged in the said apertures of the frame and supporting the rearward portion of the footboard in said elevated sleeper position with the swinging member residing in an angular position, whereby the weight load imposed upon the footboard urges the same generally in a horizontal plane, the end portions of the hook elements locking the footboard against said movement, and coacting with the swinging member to sustain the footboard rigidly in said elevated position.

12. In a collapsible vehicle for babies, said vehicle having a frame, transport wheels, and a seat on said frame, a structure for converting said vehicle into a stroller or a sleeper comprising a back rest having a lower edge portion pivotally connected to the rearward portion of said seat, releasable latch means connecting the back rest to the vehicle and selectively supporting the back rest in an erect stroller position or a generally horizontal sleeper position, a footboard, a swinging member having opposite ends pivotally connected respectively to the vehicle, and to the forward portion of the footboard, support members on the rearward portion of the footboard and engageable with the frame of the vehicle, the footboard being supported beneath the seat by the swinging member and support means when the vehicle is converted into a stroller, said swinging members swinging upwardly through an arc and guiding the footboard forwardly and upwardly to an elevated position substantially flush with the seat and extending forwardly therefrom when the vehicle is converted into a sleeper, and latch means on the seat engaging the rearward portion of the footboard in said elevated sleeper position, said link member residing in an angular position and supporting the forward portion of the footboard in said elevated position, whereby the weight load on the footboard urges the same generally in a horizontal plane against said latch means on the seat, the seat, footboard and back rest thereby being connected together and forming a generally horizontal, unitary support when the back rest and footboard are in said sleeper positions.

13. In a child's vehicle having a frame, transport wheels, and a seat on said frame, a structure for converting said vehicle into a stroller or a sleeper comprising a back rest having a lower edge portion pivotally connected to the rearward portion of said seat, latch members on opposite sides of the back rest, a pair of latch arms having their ends pivotally connected to said frame and having their swinging ends joined by a cross bar, said latch members each including an opening therethrough which is elongated in a vertical direction, said arms slidably passing through the said openings at opposite sides of the back rest, and generally vertical angular offsets extending downwardly from each of said arms engageable with said latch members of the back rest, said angular offsets engaging the latch members and supporting the back rest in an erect stroller position, said angular offsets disengaging the latch members upon upward movement of the latch arms, whereby the back rest pivots downwardly to a generally horizontal sleeper position supported by the cross bar of the latch arms, the latch members being free to slide upwardly relative to the downwardly extending offsets upon upward pivotal motion of the back rest toward the erect stroller position.

14. In a child's vehicle having a frame, transport wheels, and a seat on said frame, a structure for converting said vehicle into a stroller or a sleeper comprising a back rest having a lower edge portion pivotally connected to the rearward portion of said seat, latch members on opposite sides of the back rest, a pair of latch arms having their ends pivotally connected to said frame and having their swinging ends joined by a cross bar, each of said arms being of generally right angular shape in the plane of motion thereof, said latch members each including an opening therethrough which is elongated in a vertical direction said latch arms slidably passing through said openings at opposite sides of the back rest, the said latch arms normally suspended from the frame and each providing a generally horizontal portion passing through the elongated openings of said latch members and a generally vertical suspended portion, said suspended portions engaging the latch members and supporting the back rest in a generally vertical stroller position, said latch arms disengaging the latch members upon upward movement of the latch arms whereby the back rest pivots downwardly to a generally horizontal sleeper position supported by the cross bar of the latch arms, the latch members being free to slide upwardly relative to the said generally right angular portion of the latch arms upon upward pivotal motion of the back rest from the horizontal sleeper position, said arms thereafter swinging to said normally suspended position by gravity to latch the back rest in said vertical stroller position.

References Cited in the file of this patent
UNITED STATES PATENTS

| | | |
|---|---|---|
| 856,850 | Dobe | June 11, 1907 |
| 2,567,464 | Bancroft | Sept. 11, 1951 |
| 2,678,219 | Goodman | May 11, 1954 |
| 2,685,325 | Webster | Aug. 3, 1954 |
| 2,728,580 | Preisler | Dec. 27, 1955 |